US012653753B2

(12) United States Patent
Croxford et al.

(10) Patent No.: US 12,653,753 B2
(45) Date of Patent: Jun. 16, 2026

(54) METHOD FOR MINIMISING MOTION SICKNESS FOR HEAD-MOUNTABLE EXTENDED REALITY

(71) Applicant: Arm Limited, Cambridge (GB)

(72) Inventors: Daren Croxford, Swaffham Prior (GB); Roberto Lopez Mendez, Cambridge (GB)

(73) Assignee: ARM Limited, Cambridge (GB)

( * ) Notice: Subject to any disclaimer, the term of this patent is extended or adjusted under 35 U.S.C. 154(b) by 249 days.

(21) Appl. No.: 18/357,472

(22) Filed: Jul. 24, 2023

(65) Prior Publication Data

US 2024/0033175 A1      Feb. 1, 2024

(30) Foreign Application Priority Data

Aug. 1, 2022    (GB) ..................................... 2211173

(51) Int. Cl.
| | |
|---|---|
| *A61H 23/02* | (2006.01) |
| *G06F 3/01* | (2006.01) |
| *G06T 7/20* | (2017.01) |
| *H04R 1/10* | (2006.01) |
| *H04R 1/40* | (2006.01) |
| *H04R 3/12* | (2006.01) |

(52) U.S. Cl.
CPC ......... *A61H 23/0245* (2013.01); *G06F 3/011* (2013.01); *G06T 7/20* (2013.01); *H04R 1/1041* (2013.01); *H04R 1/403* (2013.01); *H04R 3/12* (2013.01); *A61H 23/0236* (2013.01); *A61H 2201/1604* (2013.01); *A61H 2201/165* (2013.01); *A61H 2201/5043* (2013.01); *A61H 2230/625* (2013.01); *G06T*

*2200/24* (2013.01); *G06T 2207/10016* (2013.01); *H04R 2499/15* (2013.01)

(58) Field of Classification Search
CPC ........ A61H 23/0245; A61H 2201/5043; A61H 2201/165; A61H 2201/1604; A61H 2230/625; G06F 3/011; G06T 7/20; H04R 1/1041
See application file for complete search history.

(56) References Cited

U.S. PATENT DOCUMENTS

| | | | | |
|---|---|---|---|---|
| 2012/0182206 A1* | 7/2012 | Cok | ..................... | G02B 27/017 345/8 |
| 2021/0082187 A1 | 3/2021 | Gavriliuc | | |

FOREIGN PATENT DOCUMENTS

| | | | | |
|---|---|---|---|---|
| KR | 1020180007149 A | 1/2018 | | |
| WO | 2016126522 A1 | 8/2016 | | |
| WO | WO-2019157443 A1 * | 8/2019 | ............. | A61H 23/02 |

OTHER PUBLICATIONS

Combined Search and Examination Report dated Jan. 10, 2023, GB Patent Application No. GB2211173.6.

* cited by examiner

*Primary Examiner* — Gerald Johnson
(74) *Attorney, Agent, or Firm* — Pearl Cohen Zedek Latzer Baratz LLP

(57) ABSTRACT

A method to operate a head-mountable processing system, is provided. The head-mountable processing system comprising generating one or more control signals based upon a visual motion of a sequence of images for display by the head-mountable processing system, and transmitting the generated one or more control signals to a plurality of transducers to stimulate a wearer's vestibular system.

19 Claims, 11 Drawing Sheets

910

916 pLiFU

912

918

914

920

926 cwLiFU

METHOD FOR MINIMISING MOTION SICKNESS FOR HEAD-MOUNTABLE EXTENDED REALITY

BACKGROUND

The technology described herein relates to a method for minimising motion sickness, discomfort and/or dizziness for head-mountable extended reality (XR).

In XR a user typically wears a head-mountable device (HMD) on their head. The term HMD relates to any device that can be mounted on a user's head and includes a head-mountable display, a head-mountable unit, or smart glasses. The HMD has a display, typically a display for each eye, and often incorporates various sensors. The HMD may comprise an opaque or transparent display.

The vestibular system in the inner ear provides sense of motion, head position and spatial orientation. These senses are used to maintain balance, posture, and stabilise the head during motion. The sense of motion, head position, and spatial orientation are often collectively known as the sense of balance (SOB).

Adoption of head mounted processing systems has been hampered by users experiencing motion sickness and/or dizziness when wearing an HMD. A reason why a user wearing an HMD may experience motion sickness and/or dizziness is due to a mismatch between the wearer's sense of balance and visual stimuli, such as stimuli presented on an HMD. This is a particular problem for a wearer using an HMD, as the motion of the sequence of images displayed on the HMD may conflict with the wearer's SOB. The present disclosures seek to mitigate or minimize these effects for HMDs.

BRIEF DESCRIPTION OF THE DRAWINGS

FIG. 9 depicts ultrasonic signal generation for vestibular stimulation according to an embodiment of the technology described herein.

DETAILED DESCRIPTION

Figure 1:
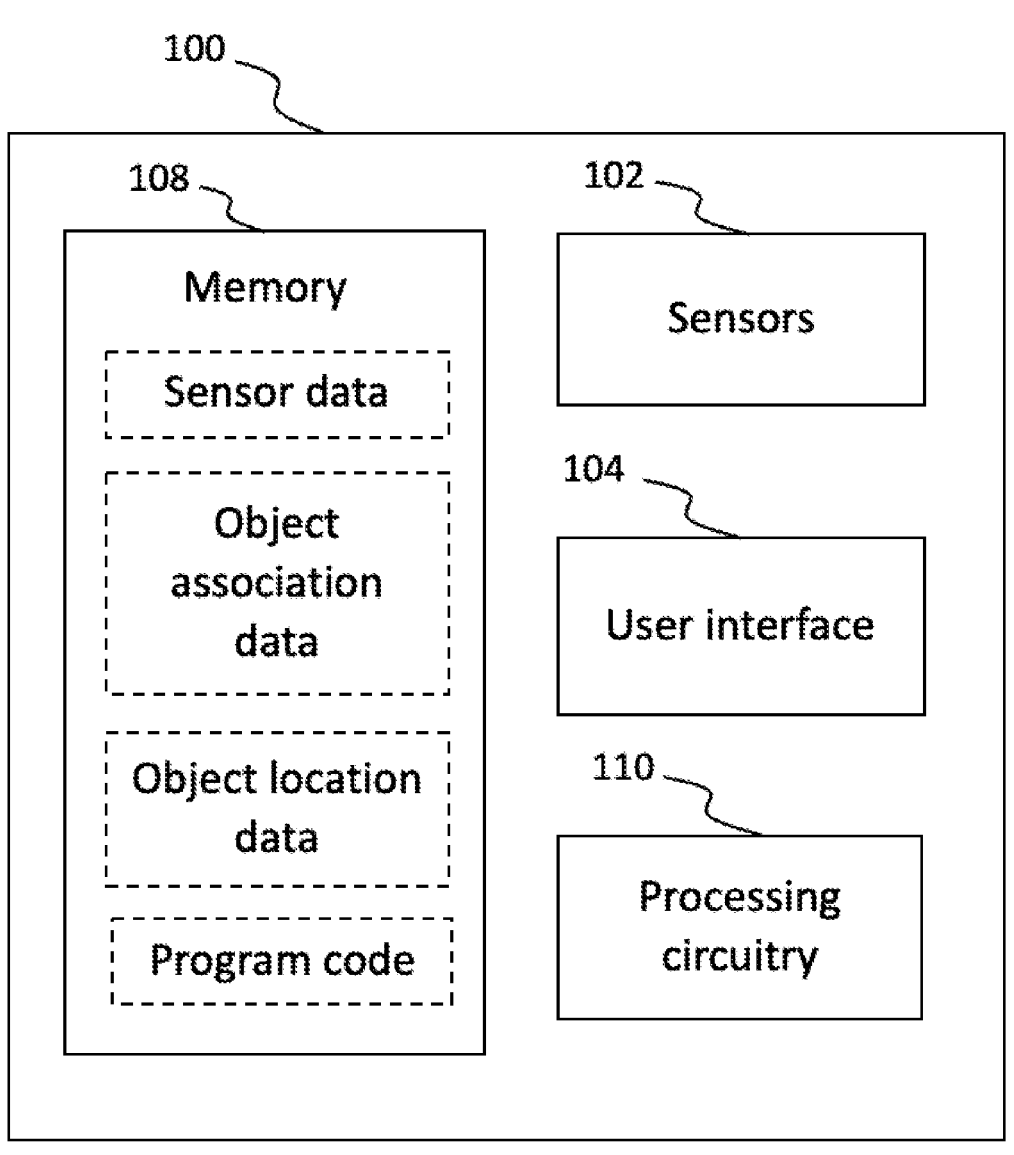
FIG. 1 is a schematic diagram showing the logical components of an exemplary HMD processing system that may be used with the technology described herein.

A first embodiment comprises a method, to operate a head-mountable processing system, the method comprising: generating one or more control signals based upon a visual motion of a sequence of images for display by the head-mountable processing system; and transmitting the generated one or more control signals to a plurality of transducers to stimulate a wearer's vestibular systems.

A second embodiment comprises a program comprising instructions that, when executed by a head-mountable processing system, cause the head-mountable processing system to perform a method according to the first embodiment.

A third embodiment comprises a head-mountable processing system comprising: a head-mountable device; a plurality of transducers for stimulation of the vestibular system of a wearer; processing circuitry to determine a visual motion of a sequence of images for display by the head-mountable processing system; control circuitry to generate one or more control signals based on the visual motion; communication circuitry to transmit one or more control signals to the plurality of transducers to control stimulation of a wearer's vestibular system.

Further features and advantages will become apparent from the following description of embodiments, given by way of example only, which is made with reference to the accompanying drawings.

A user wearing an HMD for extended reality (XR) applications may experience motion sickness, dizziness or discomfort due to a mismatch between the wearer's sense of balance and the visual stimuli displayed on the HMD. The discomfort may become more apparent to the wearer if the HMD is worn for an extended period. The mismatch between the wearer's sense of balance and the visual stimuli displayed on the HMD, reduces the quality of the experience and immersion that the wearer feels.

The Applicants have determined that if the motion of the sequence of images displayed on the HMD is determined, and the wearer's sense of balance is accordingly overridden to make the wearer feel the displayed motion, or alternatively by disabling the wearer's sense of balance, the wearer will feel less discomfort and a more immersive experience. In humans the sense of balance is provided by the vestibular system that is in each inner ear.

The Applicants have determined that Low intensity Focussed Ultrasound (LiFU) may, painlessly, be applied by an HMD processing system that is executing an XR application to control the wearer's sense of balance. When a wearer's sense of balance is controlled, the wearer's sense of balance may be partially or completely inhibited. The XR application may be configured to provide to the user an XR experience by displaying one or more virtual images via a display of the HMD processing system. To minimise discomfort when a wearer is using an HMD, the wearer's sense of balance may be disrupted by continually stimulating the wearer's vestibular systems using LiFU or alternatively may be stimulated when there is disparity between the visual motion and the wearer's motion.

To target the ultrasound on specific portions of the wearer's vestibular systems, multiple ultrasonic transducers may be used, in a beamformed configuration. Beamforming can be configured when the transducers are first worn, and re-configured manually by the wearer, or if the transducers move on the wearer's head, or if it is determined that wearer's vestibular systems are not being stimulated correctly.

The Applicants have determined that overriding the wearer's sense of balance in certain scenarios, for example whilst the wearer is standing, or the wearer is in motion may result in an accident if the wearer loses their balance. Therefore, the identity of the wearer may be identified, by using sensors or input in the HMD processing system. Once the identity of the wearer is determined, the default user configuration preferences, or wearer's configuration preferences are fetched from memory in the HMD processing system. These configuration preferences may indicate when and how the wearer's sense of balance is to be overridden, the intensity of the stimuli, what action to perform when the wearer appears to be losing their balance etc.

The Applicants have determined that using sensors in the HMD processing system, such as IMUs (Inertial Measurement Units), that can contain sensors such as accelerometers, gyroscopes and magnetometers, or positioning systems such as satellite navigation, doesn't by itself provide sufficient information to accurately indicate the wearer's pose, or indeed the wearer's motion within the environment, the wearer's ego-motion. For example, an IMU, may indicate that the wearer is in motion, based on the motion of a train on which the wearer is travelling. However, the wearer may be motionless relative to the motion of the train. Further sensors can be used either alone or in conjunction with an IMU to more accurately determine the wearer's pose and wearer's ego-motion. This information can be used to more accurately determine when and how the wearer's sense of balance is to be overridden.

The Applicants have determined that, using sensors in the HMD processing system, it is possible to determine the likelihood that the wearer will lose their balance. An indication of this determined likelihood may be provided to the XR application to modify a sequence of images displayed on the display of the HMD, and/or to modify the wearer's sense of balance so that the wearer is more likely to regain their balance.

The Applicants have also determined that, by using the sensors in the HMD processing system, it is possible to determine how the wearer is reacting (enjoyment, happiness, sadness, fear) to the experience, for example by measuring one or more of the wearer's heart rate, EMG, EEG, ECG, temperature, eye motion, and eye pupil size, and performing appropriate processing to modify the degree of stimulation. The reaction value may be determined by the XR application based on the sensor data, based on the determined reaction value the XR application may then modify the sequence of displayed images, and/or to modify the wearer's sense of balance.

Specific embodiments will now be described with reference to the figures.

FIG. 1 is a schematic diagram showing logical components of a HMD processing system, 100, that can be used to execute one or more extended reality (XR) applications.

The term 'extended reality' (XR) is primarily used in the present application, but the terms mixed reality (MR), virtual reality (VR) and augmented reality (AR) are also used in the art. In VR all the displayed image content is computer generated, i.e., virtual. In AR the computer-generated displayed image content is overlayed on the real world. In MR the computer-generated displayed image content interacts with the objects in the real world. For example, the displayed computer-generated image content can be occluded by physical objects in the real world. The term 'extended reality' should be understood in its broadest sense to encompass all those terms and cover all types of immersive technologies.

Figure 2A:
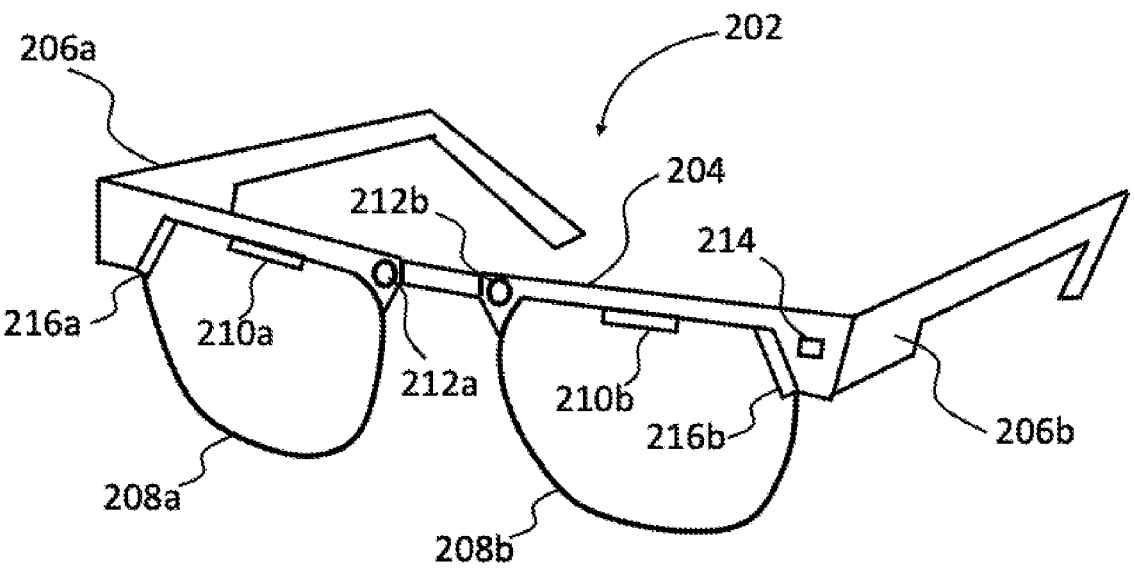
FIG. 2a depicts an isometric view of an exemplary HMD that may be used with the technology described herein.
Figure 2B:
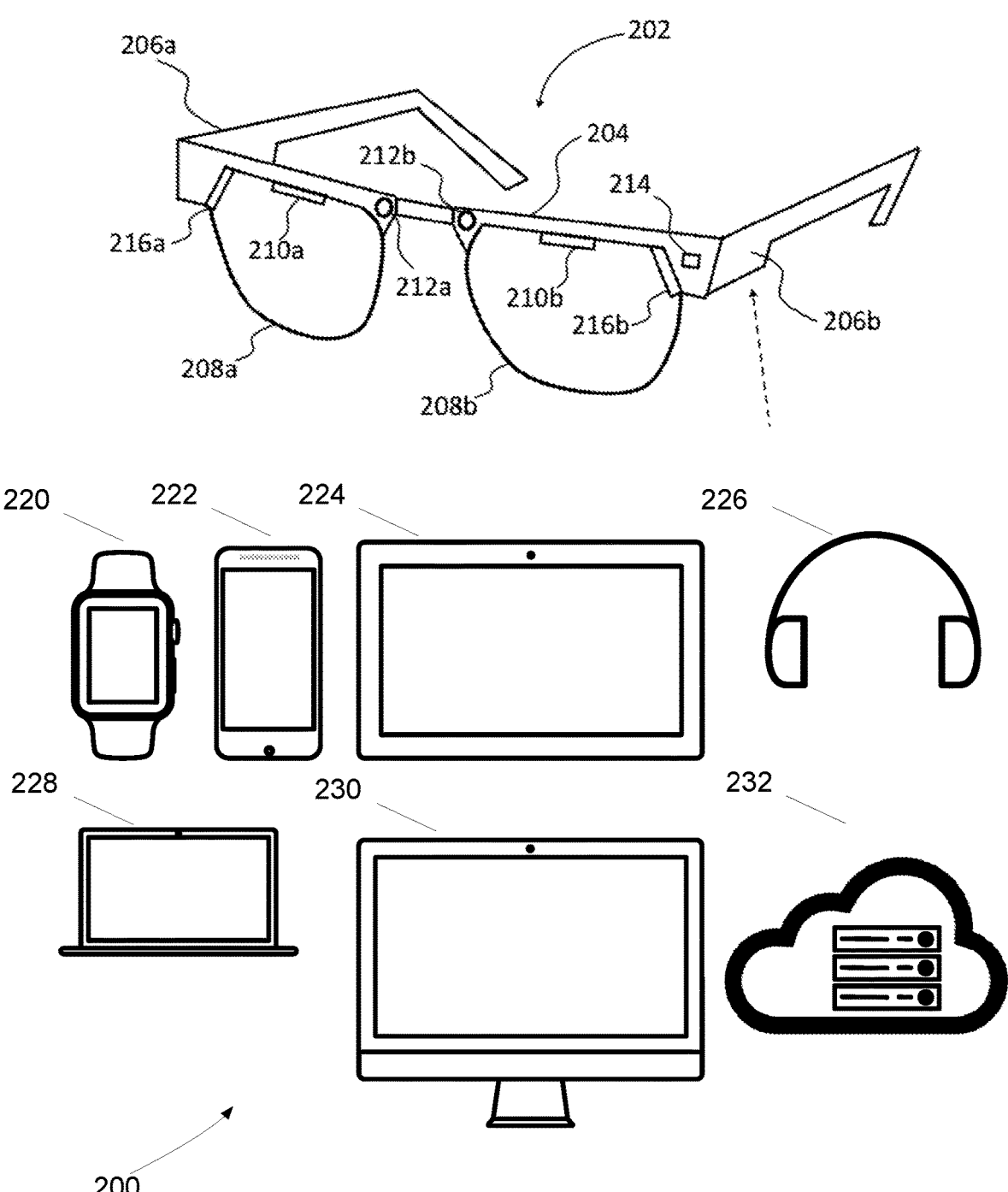
FIG. 2b depicts an exemplary HMD system that may be used with the technology described herein.

The logical components of an HMD processing system 100, in an embodiment, may be implemented in hardware as a standalone HMD 202, see FIG. 2a. Alternatively, in an embodiment, the logical components of an HMD processing system 100, may be implemented across multiple physical devices which will be referred to herein as an HMD system as illustrated in FIG. 2b, 200. In an embodiment, the sensors, processing circuitry, and memory may be implemented across multiple physical devices, where the HMD 202 is communicatively coupled with and supported by the processing capabilities and sensors of other additional computing devices. The additional devices may include one or more of a connected device, a separate processing unit, a mobile phone 222, a tablet 224, a game console, a laptop 228, a PC 230, a cloud server 232, a smart watch 220, a fitness tracker, headphones 226, a game controller, satellite navigation, see FIG. 2b. The HMD 202 shown in FIG. 2b 200, may be connected to these other devices using wireless connectivity, such as WiFi™, Bluetooth™, cellular network, or using wired connectivity. Further, the HMD may directly or indirectly, connected to the internet and may access cloud processing and storage either directly or via a connected mobile device.

An XR application, that executes on the processing circuitry 110 of the HMD processing system 100, receives input sensor data, or processed sensor data, and generates a sequence of displayed images to be displayed, additional audio stimuli, and control signals for modification of the wearer's sense of balance etc., to be output by the user interface 104 of the HMD processing system 100.

The HMD processing system 100 includes one or more sensors 102 arranged to generate sensor data representing part of an environment in which a wearer of the HMD 100 is located. The sensors 102 may include one or more cameras for generating image data representing part of the environment falling within a field of view of the one or more cameras. A forward-facing camera is arranged to face in substantially the same direction as the head of a user wearing an HMD.

The sensors 102 may include depth sensors to captured depth information. The depth sensors may include stereo cameras from which the HMD processing system 100 can derive, using stereo matching, depth information indicating distances to objects in the environment. In other embodiments, the depth sensors include an infrared camera, a sound navigation ranging (sonar) transceiver, and/or a light detection and ranging (LIDAR) system. The HMD processing system 100 is configured to combine image data and associated depth information to generate a three-dimensional representation of part of the environment, for example in RGB-D format, and/or as a point cloud or volumetric representation.

The sensors 102 include position sensors for determining a location and/or orientation of the wearer of the HMD 202. The position sensors include a satellite navigation system (for example Global Positioning System (GPS)) module, one or more IMUs, which may comprise a Hall effect magnetometer for determining orientation (an electronic compass). The HMD processing system 100 is additionally capable of determining or refining an estimated position of the user by analysing image data and/or depth information captured from the image and depth sensors using simultaneous location and mapping (SLAM) techniques. This SLAM process is, in general, not processor intensive and is run continuously while the HMD processing system 100 is operational.

The HMD processing system 100 includes a user interface 104 via which the user can interact with the HMD processing system 100. The user interface 104 includes input devices and output devices that are a part of the HMD processing system 100. The output devices include one or more displays integrated in the HMD 202 for providing visual information to the user. The one or more displays may include an opaque display arranged to generate and display image data corresponding to a representation of part of the environment generated using the one or more cameras and/or depth sensors (e.g. captured sensor imagine data), with additional information or virtual objects overlaid or otherwise combined with the generated representation of the environment. A transparent display may be provided through which the user can directly observe the environment, and on which information or virtual objects are projected, for example using waveguiding or laser scanning display technology. Irrespective of the display technology used, the displayed image may comprise of virtual objects, a representation of the environment or a combination of both.

The output devices may include one or more speakers, for example mounted in an earpiece or headphones, allowing the HMD processing system 100 to output information to the wearer in the form of audio. The headphones may or may not be integrated into the HMD 202. The one or more speakers may be bone-conducting or air-conducting. The speakers may allow the wearer to continue to hear ambient sounds as well as those generated by the speaker. The speaker may output both normal and ultrasonic audio.

The input devices further include buttons or touch input devices. For example, the HMD processing system 100 may include one or more scroll-wheels, touch-sensitive regions, or trackpads. Additionally, the input devices may include a microphone array for detecting sounds. The input devices may include one or more eye-tracking sensors arranged to track orientations and/or motion of the wearer's eyes. An eye-tracking sensor may, for example, be an optical eye-tracking sensor(s) capable of tracking an orientation of an eye by analysing images of the eye generated by an eye-facing camera, such as an infrared camera. Alternatively, eye tracking can be performed using, MEMS (micro-electromechanical) sensor(s). In addition, the input devices may include gesture recognition, by using the front facing camera 102 and/or depth sensor 102.

The HMD processing system 100 includes a memory 108 and processing circuitry 110. The memory 108 and the processing circuitry 110 may be located wholly in the HMD 202, or may be distributed between one or more separate devices, in embodiments HMD 202, a dedicated computing device, a smartphone 222, a tablet 224, a game console, or laptop computer 228, a desktop computer 230, a server 230, or one or more devices in a networked system 232. In embodiments, certain data storage and processing tasks take place locally in the HMD 202, whilst other data storage and processing tasks take place remotely. In this way, the data storage and processing performed by the HMD 202 can be kept to a necessary minimum, allowing the HMD 202 to have a size, weight and form factor that are practical and attractive for prolonged use and/or everyday use of the HMD 202.

The memory circuitry 108 includes non-volatile storage, for example in the form of one or more solid-state drives (SSDs), and/or NVRAM (Non-Volatile RAM) along with volatile random-access memory (RAM), for example static random-access memory (SRAM), synchronous DRAM and dynamic random-access memory (DRAM). Other types of memory can be included, such as removable storage, and so on.

The processing circuitry 110 may include various processing units including a central processing unit (CPU), a graphics processing unit (GPU), an image signal processor (ISP), and/or a specialist neural processing unit (NPU) for efficiently performing neural network operations. Neural networks may be used for certain tasks including object detection. The processing circuitry 110 may include other specialist processing units, such as hardware accelerators, application specific integrated circuits (ASICs), digital signal processors (DSPs), or field programmable gate arrays (FPGAs).

The memory 108 is configured to store machine-readable instructions in the form of program code which, when executed by the processing circuitry 110, cause the HMD processing system 100 to perform methods as described hereinafter.

The memory 108 also stores the default user configuration preferences and where there are multiple users, each of the wearer's configuration preferences. These configuration preferences comprise data representative of a user's attribute data and data relating to their preferred degree to which balance is to be overridden by the HMD processing system 100. For example, preferences with regarding, the HMD calibration (see FIGS. 7a and 7b), the HMD processing system configuration, when the wearer's sense of balance is to be overridden (e.g. when sitting, standing, walking), how the wearer's sense of balance is to be overridden (e.g. disabling the wearer's sense of balance, or modifying the wearer's sense of balance to align with the visual motion), the threshold when the wearer's sense of balance is overridden, the intensity of the stimuli, what action to perform when the wearer appears to be losing their balance etc.

The memory 108 is also arranged to store further data for use in performing said methods.

An HMD processing system 100 including various combinations of the features described above are available commercially. Examples of AR and MR devices include Microsoft® Hololens® and Magic Leap® Magic Leap 1®. Examples of VR devices include Facebook Oculus® Quest®, Sony® PSVR®. Various methods are described below, and it will be appreciated that the configuration of hardware required for each method depends upon the use case MR, AR, and VR, and the sensors used in that method.

FIG. 2a illustrates an example standalone HMD 202 that implements an HMD processing system 100. The HMD 202 include a central frame portion 204 and two folding arms 206a, 206b, where the central portion 204 acts as a support for two lenses 208a, 208b. The central frame portion 204 and the arms 206a, 206b house various sensors and user interface components (e.g. input and/or output devices), as will be described below. The lenses 208a, 208b in this embodiment are neutral, though in other embodiments the lenses could be corrective lenses matching a prescription of a specific user, and/or could be tinted, for example in the case of smart sunglasses. Each of the lenses 208a, 208b is a transparent display on which a corresponding projection component 210a, 210b is arranged to display information for the wearer. In embodiments the lenses 208a, 208b comprise an opaque or semi/opaque display. Transparent displays are typically used for AR and MR, whereas opaque displays are typically used for VR.

The central frame portion 204 houses two front-facing cameras 212a, 212b to capture images in front of the wearer.

The HMD processing system 100 may be arranged to analyse image data generated by the front-facing cameras 212a, 212b using stereo matching to determine depth information. The central frame portion 204 further houses a microphone 214 for receiving sound input both from the user and from the surrounding environment. The HMD 202 may incorporate optical eye-tracking sensors 216a, 216b for tracking orientations and motion of the wearer's right and left eye respectively. The optical eye-tracking sensors 216a and 216b include associated processing circuitry in the HMD processing system 100 for determining a direction in which the user is looking. The HMD 202 arms 206a, 206b house a dedicated power supply, processing circuitry and memory circuitry, as well as sensors. The sensors may include one or more of an IMU, an EEG (electroencephalography) sensor, an ECG (electrocardiography) sensor, an EMG (electromyography) sensor, a light emitter and light sensor pair to determine pulse and blood flow, a temperature sensor, and a skin resistance sensor. The HMD 202 also includes a communication module including an antenna for communicating wirelessly, such as by using WiFi™, Bluetooth™ and/or a cellular network. This allows the device to communicate wirelessly with other devices, for example, with a wireless-headphones, mobile phone, smartwatch etc. The HMD 202 may also support wired connectivity.

The HMD 202 may also contain a satellite navigation system (e.g. GPS) receiver, an electronic compass etc.

Speakers/transducers may be integrated into the arms 206a, 206b of the HMD 202. These speakers/transducers (not-shown) may be in-ear, on-ear, over-ear or bone conducting. In embodiments, the HMD 202 are coupled to separate in-ear, on-ear, over-ear or bone-conducting headphones 226, or a hearing aid, e.g., by a wired or wireless connection, Bluetooth™, or Wi-Fi™.

Both audible and ultrasonic frequencies may be provided to the user using one or more speakers. In some embodiments there are multiple speakers/transducers allowing the ultrasound and/or audible sound to be beamformed.

The HMD processing system 100 is arranged to determine a pose (i.e., position and orientation) of the user using the satellite navigation receiver and the electronic compass of the HMD processing system 100, and/or using an IMU (housed in 206a, 206b) of the HMD 202 and/or by processing image data from the cameras 212a, 212b e.g. using SLAM. The HMD processing system 100 is configured to continually monitor the position of the wearer, but in embodiments may determine the position of the wearer only when certain events are detected (for example, when movement of the wearer is detected by the IMUs).

FIG. 2b depicts an example HMD system 200, where the HMD 202 is communicatively coupled with and supported by other devices to implement an HMD processing system 100. For example, an HMD system 200 may comprise one or more of a smart watch 220, a smart phone 222, a tablet 224, headphones (which may be on-ear, over-ear, in-ear, air-conducting, bone conducting etc.), 226, a laptop 228, a computer which may be a personal computer or a server 230, cloud server 232, a game console, a fitness tracker, a WiFi™ router, a smart ring, a smart belt, smart shoes, smart jewellery, a smart bracelet, a HRM (heart rate monitor) etc. The devices may be local to the HMD 202 for example a smart watch 220, or a smart phone 222, or the device may be remote from the HMD 202, for example a cloud server.

Controls on the HMD 202, or other devices in the HMD processing system 100, for example, an app on a connected mobile phone 222, console, tablet 224, or personal computer 230, or connected device, such as a game controller or keyboard, can be used to configure the HMD processing system 100 in accordance with preferences of the wearer. For example, the wearer can use the controls to select which headphones to use, to specify under which conditions vestibular stimuli is provided, the magnitude of the stimuli, and to request device recalibration. The controls may be implemented using physical or virtual buttons (buttons on a touch screen), gestures, eye tracking, or by using audio commands.

The storage, in embodiments, on the connected compute unit, mobile phone 222, console, tablet 224, personal computer 230 or cloud server 232, in the HMD processing system 100, can be used in addition to the memory circuitry of the HMD 202 to store data for use by the HMD processing system 100. The HMD processing system 100 can further utilise processing capabilities of the compute unit, mobile phone 222, console, tablet 224, personal computer 230 or cloud server 232 to perform certain resource-intensive processing tasks, such as SLAM. Sharing the storage and processing requirements of the HMD 202 between the compute unit, mobile phone 222, console, tablet 224, personal computer 230 or cloud server 232, etc. allow for the size, weight, and form factor of the HMD 202 to be similar to a regular pair of glasses, such that a user can comfortably wear the HMD 202 for prolonged periods of times, and on an everyday basis.

Figure 3A:
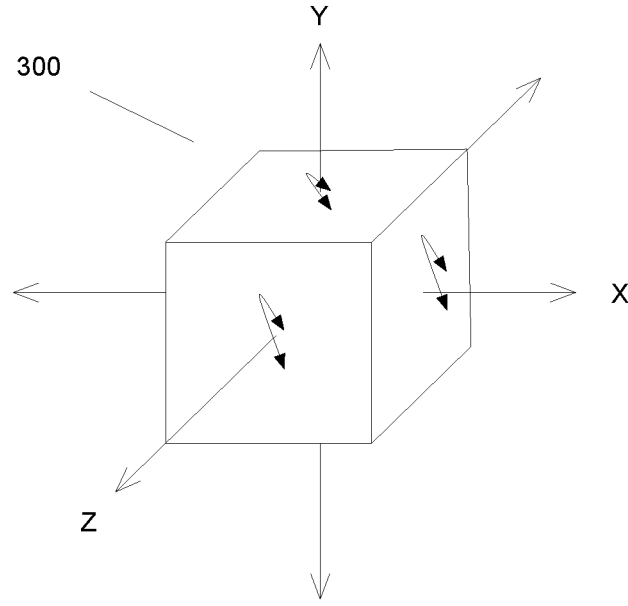
FIG. 3a depicts exemplary degrees of freedom of motion that may be used with the technology described herein.
Figure 3B:
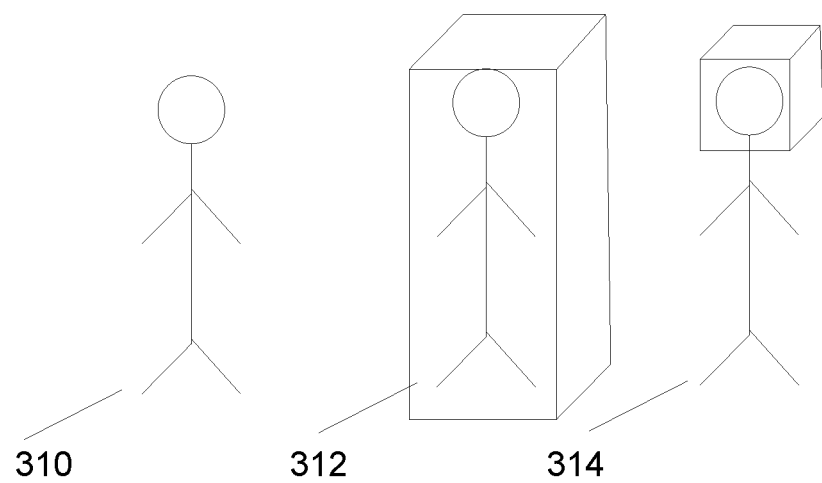
FIG. 3b depicts exemplary degrees of freedom of motion wearer that may be used with the technology described herein.

FIG. 3a depicts degrees of freedom of motion. There are six degrees of freedom of an object 300, movement along the three axes (x,y,z) and rotation about these axes (x,y,z). FIG. 3b shows that a wearer 310 moving in an environment can exhibit all six degrees of motion 312. In addition, the wearer's head and neck 314 can be (somewhat) moved independently of the wearer's body, the head can be rotated about the three axes (x,y,z) and the neck allows limited movement along the three axes (x,y,z). The vestibular system is a sensory system, that is located within the inner ear of the head, and creates the wearer's sense of balance.

When the HMD 202 is worn on the wearer's head, the sensors integrated into the HMD 202, the IMU (housed in 206a, 206b), and front-facing camera 212a, 212b of the HMD 202, with suitable processing, are able to determine the wearer's head position, the wearer's pose (position and orientation) and wearer's motion.

The wearer's head position and the wearer's pose are determined by using accelerometer, gyroscope, and optionally magnetometer sensor data from the IMU. The wearer's motion may be determined using accelerometer, gyroscope, and optionally magnetometer sensor data from the IMU, or by using information from satellite navigation. The accelerometer, gyroscope, and optionally magnetometer sensor data from the IMU, may be used to determine the type of motion of the wearer, for example whether the wearer is sitting, walking, running. For example, the accelerometer, gyroscope, and optionally magnetometer may be analysed/processed to determine if there is periodic vertical and horizontal movement with a magnitude and period indicative that the wearer is walking. It is assumed that the wearer is walking if the determined probability that the wearer is walking is above a threshold level. The threshold level may be determined using heuristics, for example through statistical analysis of walking for a number of users, or through analysis of the walking wearer's motion, behavioural modelling of walking, or alternatively machine learning techniques may be used to determine if a user is walking.

In an embodiment visual odometry processing of the sensor data from the front-facing camera 212a, 212b may be used to determine the motion and pose of the wearer. In an embodiment, SLAM (Simultaneous Location and Mapping)

processing is used to determine the pose, motion, and location of a wearer. SLAM typically, uses sensor data from both the IMU (housed in 206a, 206b) and front-facing camera 212a, 212b.

The wearer's motion and wearer's ego-motion, the motion of a wearer in an environment, are often the same, for example the wearer walking in a park. However, the wearer's ego-motion and wearer's motion may be different, for example a wearer walking on a moving train. In this case, the wearer's motion comprises both the motion of the train and walking along the train. However, the wearer's ego-motion is the wearer's motion within the train, i.e. motion relative to the train. A wearer's environmental SOB (sense of balance) is based on the wearer's motion.

The sensors and suitable processing provide:

Wearer's motion: The motion of the wearer. Typically provided by IMU sensor data, satellite navigation or a combination of IMU sensor data and satellite navigation. The IMU sensors are housed in the arms 206a and 206b of the HMD 202.

Wearer's ego-motion. The wearer's motion within an environment. The wearer's ego-motion determined by front-facing camera 212a, 212b and IMU sensor data, and visual odometry or SLAM processing. The IMU sensors are housed in the arms 206a and 206b of the HMD 202.

Wearer's environmental SOB. The wearer's SOB within an environment. The wearer's environmental SOB can be predicted based on IMU sensor data. The IMU sensors are housed in the arms 206a and 206b of the HMD 202.

Wearer's pose. The pose (position and orientation) of the wearer. The wearer's pose determined by front-facing camera 212a, 212b and IMU sensor data and visual odometry or SLAM processing. The IMU sensors are housed in the arms 206a and 206b of the HMD 202.

Wearer's use motion, is defined to be at least one of a wearer environmental SOB, a wearer motion, a wearer ego-motion, or a wearer pose.

A sequence of images (to be displayed on the HMD 202) may exhibit all six degrees of freedom. This is known as the visual motion.

The XR application, (that executes on the HMD processing system 100), for example a game, or VR or AR experience, generates a sequence of images for display on the display of the HMD 202. The visual motion of the sequence of images (to be displayed on the HMD 202) is in an embodiment determined by interrogating the XR application that generates the displayed images. In an alternate embodiment the visual motion is determined by analysing the sequence of images (to be displayed on the HMD 202) to determine the visual motion.

In VR where the displayed images are likely to be entirely generated, the wearer's ego-motion is of less importance. In VR the visual motion is likely to be different from the wearer's motion and wearer's environmental SOB.

In MR/AR the wearer is likely to see generated virtual objects (image data) (shown on a transparent display) combined with visual information from the environment (e.g. through the transparent display). In MR/AR the generated virtual objects displayed on the HMD 202, are often generated so as to appear to the user as being located in the environment, for example an image of a virtual coffee cup appears to be located on a physical table. Therefore, the visual motion will often be dependent on the wearer's ego-motion. However, the wearer's ego-motion might not align with the wearer's motion or wearer's environmental SOB, for example when the wearer is walking on a moving train.

Where there is a significant disparity between the wearer's environmental SOB and visual motion (the difference between the visual motion and the wearer's user motion exceeds a predetermined threshold) the wearer may feel motion sickness and discomfort. The wearer's SOB can be stimulated by ultrasound to reduce discomfort and increase immersiveness.

Ultrasound can be used to inhibit the wearer's SOB. Alternatively, the wearer's SOB can be modified so as to be aligned with the visual motion, known as wearer display-aligned SOB.

Figure 4:
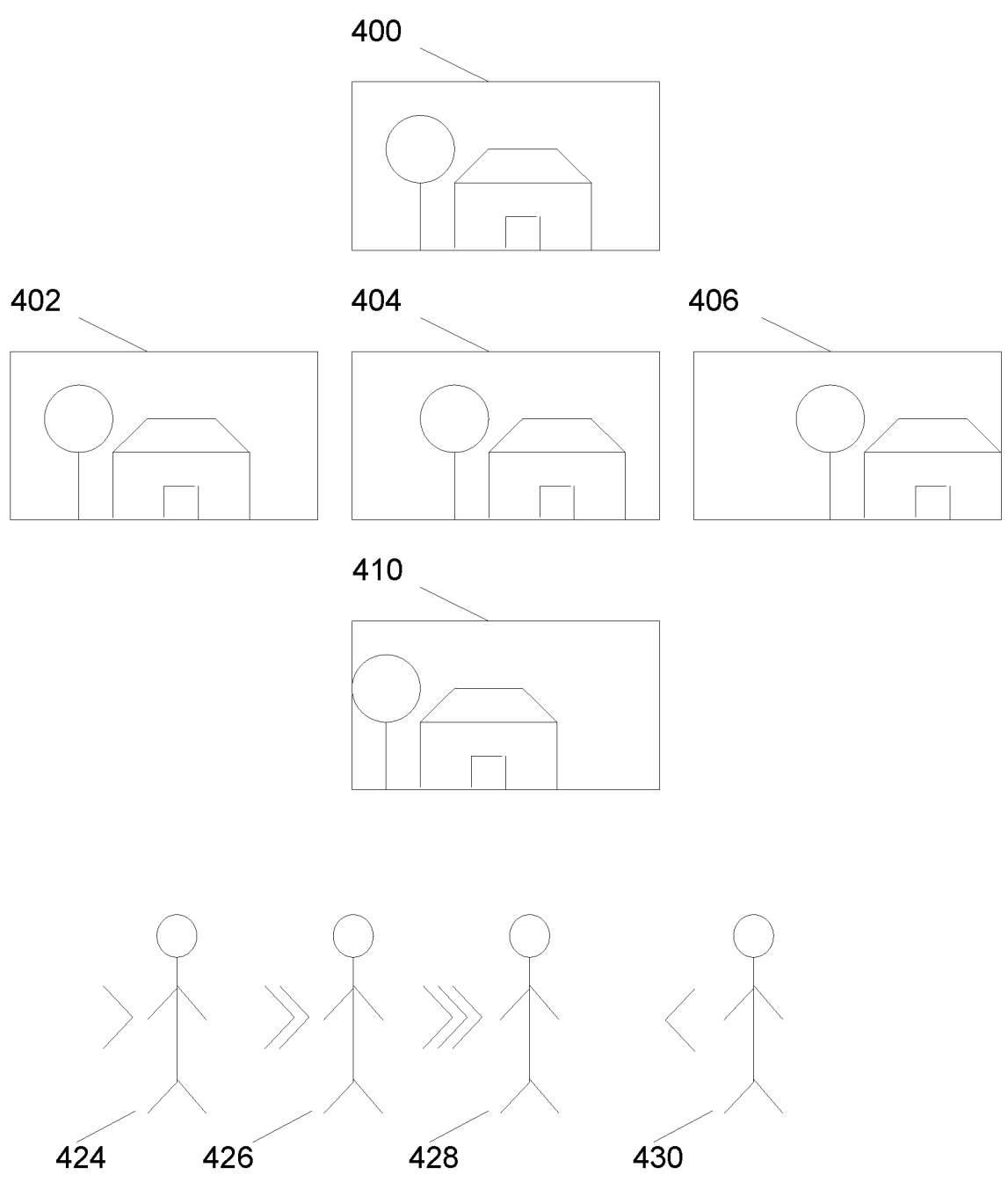
FIG. 4 depicts an exemplary disparity between a wearer's environmental SOB and visual motion.

FIG. 4 depicts example images (400, 402, 404, 406, 410) generated by an HMD processing system 100 and different motions of the wearer (424, 426, 428, 430), to illustrate disparity between the wearer's environmental SOB and visual motion. To simplify the figure, only left and right motion of the wearer, and the corresponding sequence of images displayed on the HMD 202, is shown. However, in practice, movement along all three axes (x,y,z) and rotation about the three axes (x,y,z) is considered.

Both the displayed motion and motion of the wearer (wearer's motion), if any, will determine the disparity between the visual motion and the motion felt by the wearer from the wearer's SOB. If the disparity is large, the wearer is likely to feel less comfortable.

The focus and acoustic intensity of the ultrasonic stimulation on the wearer's vestibular system will be based on the visual motion, and wearer's motion, if any. If the wearer is not in motion, then the focus acoustic intensity of the ultrasound on the wearer's vestibular system will be dependent upon the visual motion. If the wearer's motion is the same, but with a smaller magnitude as the visual motion, then the focus and acoustic intensity of the ultrasound, will be reduced compared to when the wearer is not in motion.

If the wearer's motion is different to the visual motion, then the focus and acoustic intensity of the ultrasound, on the wearer's vestibular systems will be configured to eliminate the feeling of motion by the wearer's SOB from the wearer's motion, and simulate the displayed motion felt by the wearer by modifying the wearer's SOB.

If the wearer's motion is opposite to the displayed motion, then the focus and acoustic intensity of the ultrasound on the wearers vestibular systems will be increased compared to when the wearer is not in motion.

Figure 9:
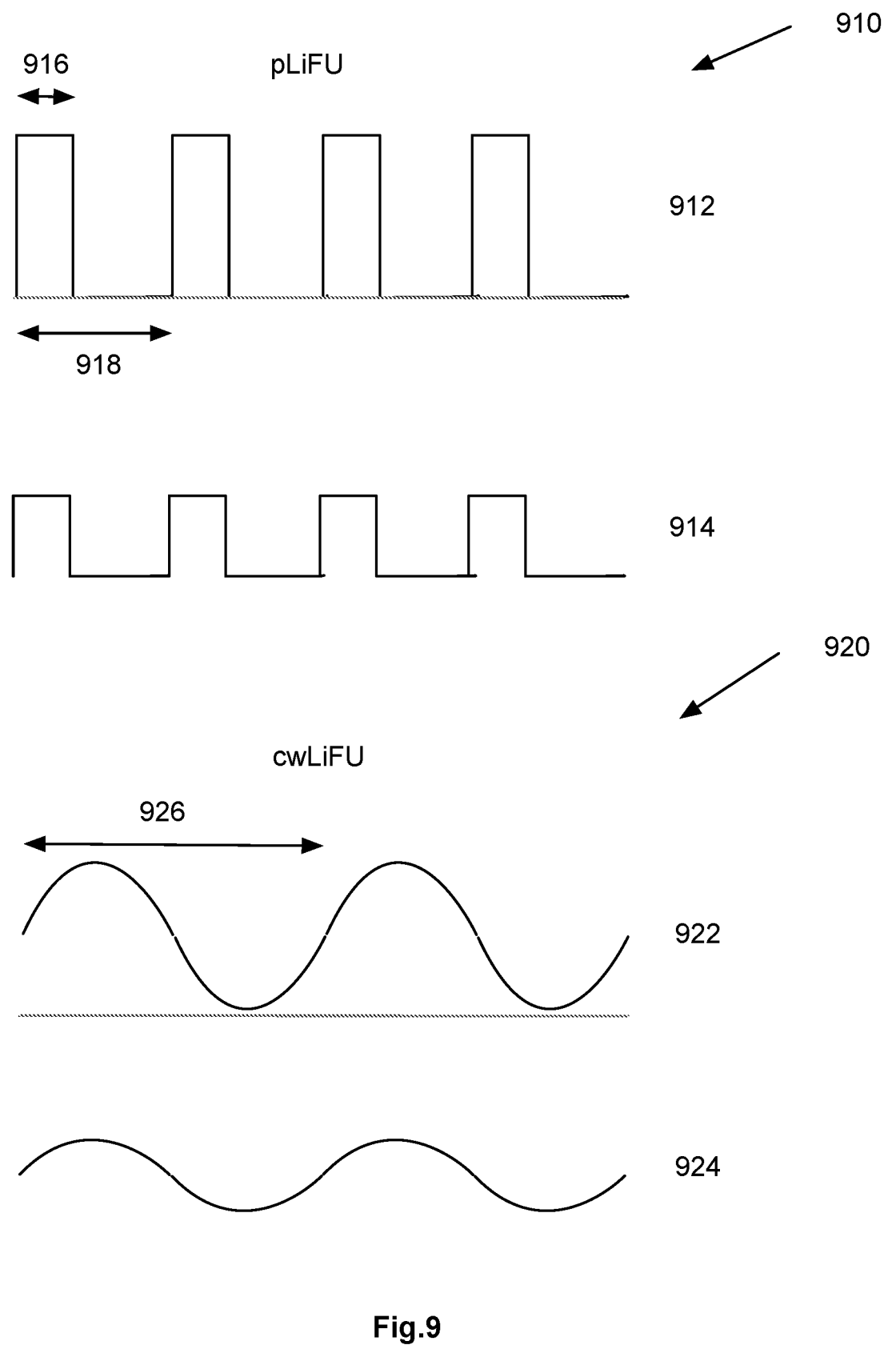

For more information, FIG. 9, and the associated description, depicts exemplary ultrasonic signal generation for vestibular simulation according to an embodiment of the technology described herein.

Figure 6:
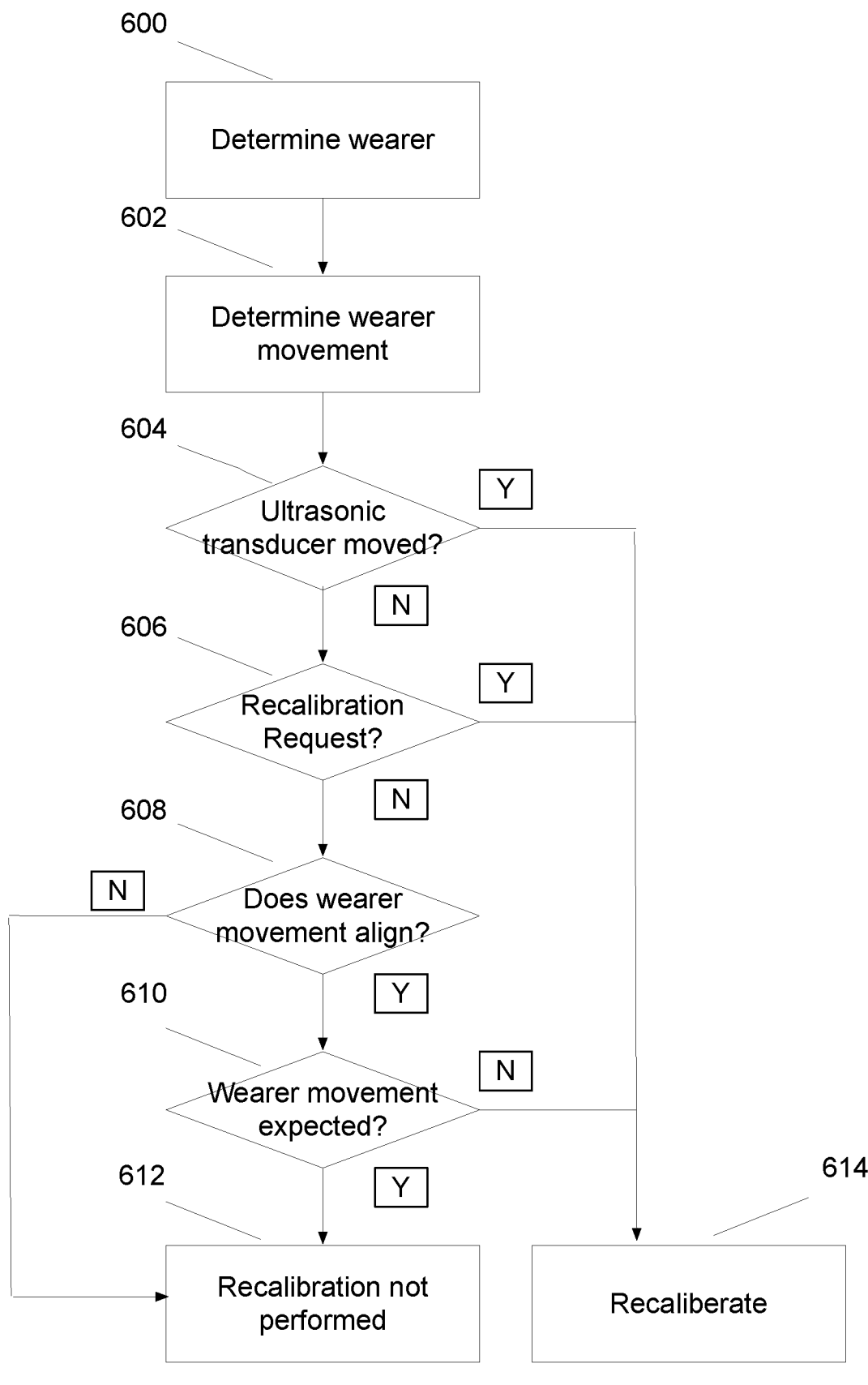
FIG. 6 illustrates a flow chart for determining when to perform transducer re-calibration for an HMD according to an embodiment of the technology described herein.
Figure 7A:
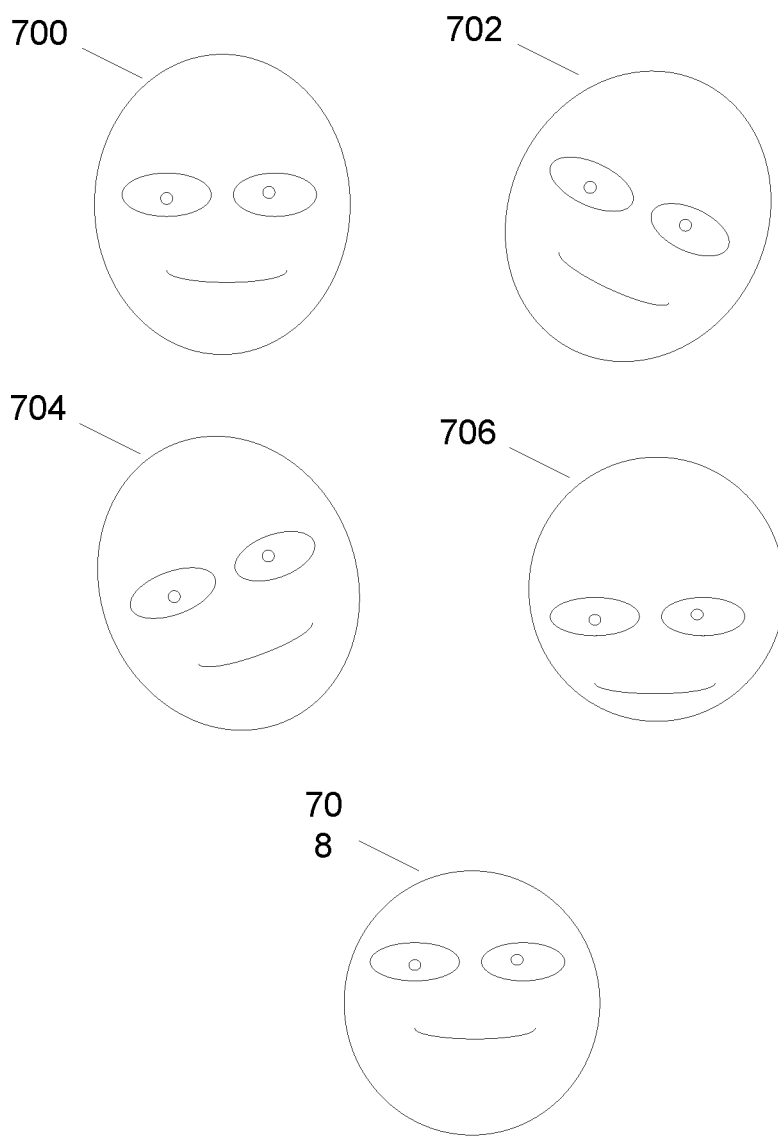
FIG. 7a illustrates an exemplary wearer when there is a mismatch between the transmitted and generated control signal to the ultrasonic transducer and the motion.

Determining the ultrasound focus and acoustic intensity to stimulate the wearer's SOB, is depicted in FIG. 6 and FIG. 7a. FIG. 6, and the associated description, that illustrates a flow chart for determining when to perform transducer re-calibration for an exemplary HMD processing system 100 that may be used with the technology described herein. FIG. 7a, and the associated description, that depicts when there is a mismatch between the transmitted and generated control signal to the ultrasonic transducer and the motion felt by a wearer.

Looking again at FIG. 4, image 400 shows a first image to be displayed on the HMD 202, and example subsequent images 402, 404, 406 and 410 are also illustrated, which are to be displayed after the first image 400.

If the subsequent image 402 displayed on the HMD 202, has little visual motion, and the wearer is stationary, e.g.

sitting, standing or lying down, there will be little disparity between the wearer's environmental SOB and the visual motion, and therefore the wearer will likely experience little discomfort and/or motion sickness.

If, whilst the wearer is stationary, sitting, or standing or lying down, the subsequent displayed image shows a small movement to the right (as in image 404) or left (as in image 410), there will be some disparity between the wearer's environmental SOB and visual motion. Depending upon the wearer, the wearer may experience some discomfort and/or motion sickness.

If there is a large disparity between the wearer's environmental SOB and visual motion, for example, when the wearer is stationary and the displayed image shows a large motion 406, the wearer is likely to feel discomfort and/or motion sickness.

Motion sickness may be more pronounced if the wearer is in motion and the wearer's visual motion and wearer's motion are significantly different, for example when the wearer is moving right 424 slowly, whilst the displayed image shows motion in a different direction, for example displaying left motion 404, 406.

The wearer pose and motion of the wearer, for example, moving, as illustrated in 424, 426, 428, 430, or standing, sitting, or lying down can be determined by using sensor data from the IMU located in the HMD 202, 206*a*, 206*b*. Alternatively, or in addition, sensor data from the front facing cameras 212*a*, 212*b*, together with appropriate processing, for example using visual odometry or SLAM, may be used to determine wearer pose and wearer motion.

The wearer may configure when and by how much, the wearer's environmental SOB is overridden by vestibular stimulation. For example, the wearer may configure the system to only to override the wearer's environmental SOB when the magnitude of the disparity between the wearer's environmental SOB and visual motion exceeds a configured threshold. The wearer may also indicate whether their sense of balance is stimulated when they are sitting, lying, standing, in motion, or moving rapidly, as overriding the wearer's environmental SOB when the wearer is standing or in motion could result in the wearer losing their balance.

Figure 5:
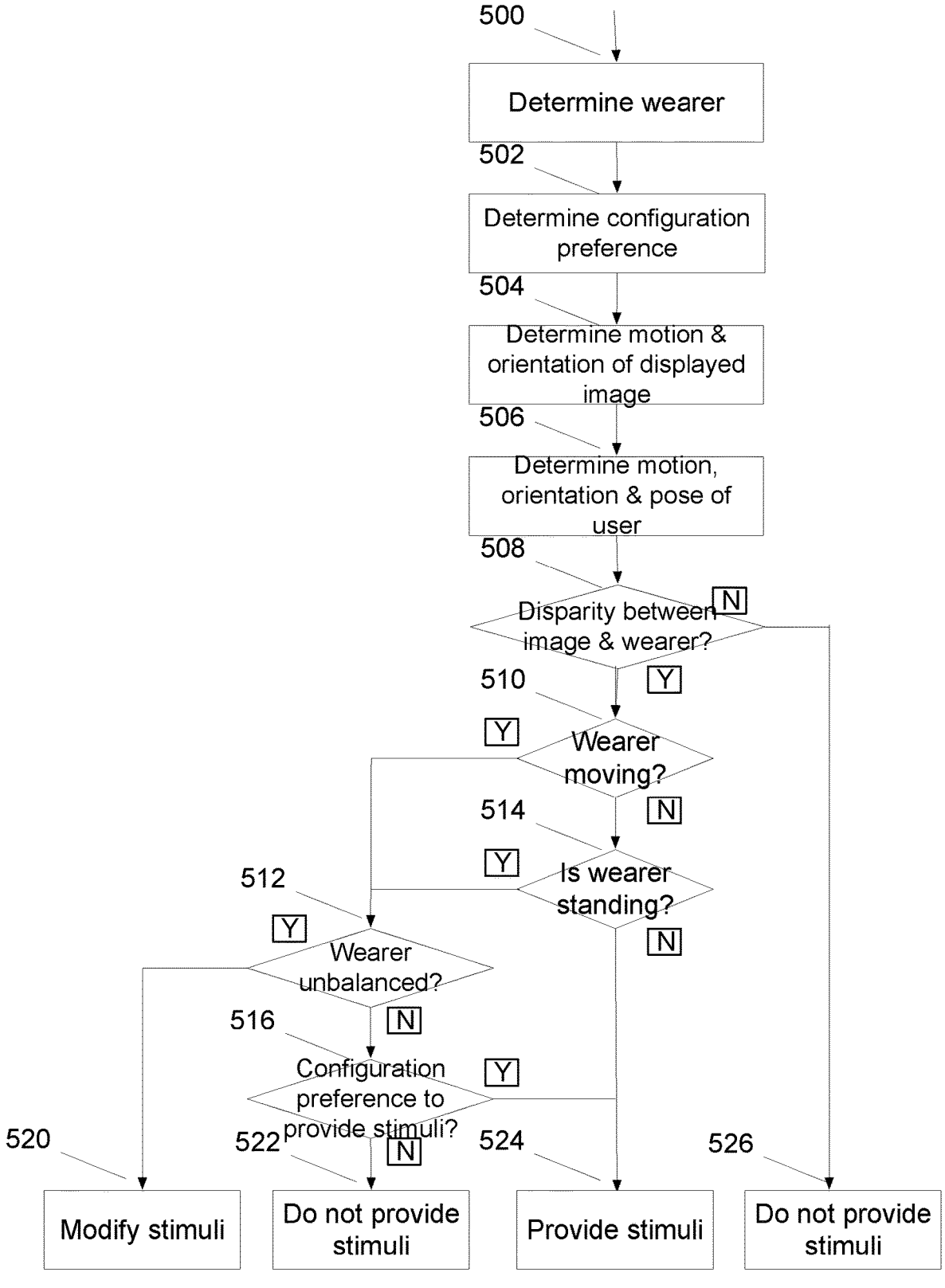
FIG. 5 illustrates a flow chart for determining when to transmit and generate control signals to ultrasonic transducers according to the technology described herein.

FIG. 5 illustrates an example flow chart for determining when to generate one or more control signals and transmit to a plurality of the ultrasonic transducers to override the wearer's environmental SOB to minimise discomfort and/or motion sickness when wearing the HMD 202.

In an embodiment, at step 500 the identity of the wearer is optionally determined. This may be performed by the wearer logging into the HMD processing system 100 using access data such as a password, voice command, or by using biometrics.

The wearer may log into the HMD processing system 100 by typing on a virtual keyboard on a connected, smart phone 222, smart watch 220, tablet 224 or a physical keyboard. Alternatively, a wearer may provide their details using gesture recognition, by using the front facing camera in the HMD 202, or by detecting wearer eye movement by using the eye tracking sensors in the HMD 202. In an embodiment, a microphone integrated into the HMD 202, or another device in the HMD processing system 100, for example smart phone 222, may be used to issue voice commands to identify the user. In an embodiment, biometric identification could be used to automatically identify the user for example by using eye tracking sensors of the HMD 202 to perform iris recognition, or face recognition. Sensor data from a microphone in the HMD processing system 100 could be used identify the user from their voice. Alternatively, over ear, on-ear or in-ear headphones integrated into the HMD 202, or part of the HMD processing system 100, may have an integrated microphone sensor. This sensor can be used to detect otoacoustic emissions (OAE) and identify the user.

If the wearer is successfully identified, at step 502 the wearer's configuration preferences are fetched from memory 108. These configuration preferences may indicate when and how the wearer's sense of balance is to be overridden, the intensity of the stimuli, what action to perform when the wearer appears to be losing their balance. If step 500 fails or is not performed, default user configuration preferences are used. The method then proceeds to step 504, at which the HMD processing system 100 determines the visual motion and orientation of the sequence of images displayed on the HMD 202. The visual motion of the sequence of images displayed on the HMD 202 is in an embodiment determined by receiving movement information from the XR application that generates the displayed images. In an alternate embodiment the visual motion is determined by analysing the sequence of images to be displayed to determine the visual motion.

At step 506, the wearer user motion is determined, by using sensor data located in the HMD 202. The wearer's pose is determined by using accelerometer, gyroscope, and optionally magnetometer sensor data from the IMU. The wearer's motion may be determined using accelerometer, gyroscope, and optionally magnetometer sensor data from the IMU or by using position information from satellite navigation system. The accelerometer, gyroscope, and optionally magnetometer sensor data from the IMU, may be used to determine the type of motion of the wearer, for example whether the wearer is sitting, walking, or running. For example, the accelerometer, gyroscope, and optionally magnetometer may be analysed/processed to determine if there is periodic vertical and horizontal movement with a magnitude and period indicative that the wearer is walking. A wearer is determined to be walking if the probability that they are walking is above a threshold value. In an alternate embodiment visual odometry processing of the sensor data from the front-facing camera 212*a*, 212*b* may be used to determine the motion and wearer pose. In an embodiment, SLAM (Simultaneous Location and Mapping) processing is used to determine the wearer pose, motion, and location of a wearer. SLAM typically, uses sensor data from both the IMU (housed in 206*a*, 206*b*) and front-facing camera 212*a*, 212*b*.

At step 508 it is determined whether there is a significant mismatch between the visual motion of the sequence of images displayed on the HMD 202 and the wearer's environmental SOB. The significant mismatch threshold is part of the configuration preferences provided by the wearer, if the wearer is not identified a default significant mismatch threshold is used.

If there isn't a significant difference between the stimuli at step 508, the method terminates at step 526 where stimuli are not provided to modify the wearer's SOB. Specifically, control signals based on the motion of the sequence of images displayed on the HMD 202 is not generated and/or transmitted to the ultrasonic transducer to provide stimuli to the wearer's vestibular systems. If in step 508 it is determined that there is a significant mismatch (above a predefined threshold) between the visual motion of the sequence of images displayed on the HMD 202 and the wearer's environmental SOB, the method proceeds to step 510.

At step 510, the wearer user motion determined in step 506, is analysed. If it is determined that the wearer is in motion, the method proceeds to step 512.

At step 512 the wearer user motion is analysed to determine if the wearer is likely to lose their balance. For example, if the wearer is standing, or in motion, a wearer loss of balance probability is determined by, in an embodiment, analysing the sensor data from the IMUs housed in arms 206*a*, 206*b* and/or front-facing cameras 212*a*, 212*b* to determine whether the wearer is exhibiting erratic, unsteady motion, and/or if the wearer is using their arms to maintain balance as detected by the front-facing camera and/or there are audible sounds uttered by the wearer when they are losing their balance, as detected by a microphone etc. The HMD processing system 100 is configured to determine that the wearer is losing their balance if the determined loss of balance probability of the exceeds a predetermined threshold.

The threshold level may be determined using heuristics, for example through statistical analysis of a number of wearer's losing their balance, or through analysis of the wearer losing their balance, or alternatively machine learning techniques may be used to determine if a wearer is losing their balance.

Alternatively, the sensor data may be analysed using machine learning techniques to determine whether the wearer is losing their balance. If the wearer appears to be losing their balance, the method proceeds to step 520.

At step 520 the stimuli experienced by the wearer is modified. This can be performed by signalling the application generating the image sequence to minimize the disparity between the wearer's environmental SOB and visual motion, by modifying the visual motion of the sequence of image displayed on the HMD 202. This may be performed by fading the sequence of images displayed on the HMD 202, introducing a tunnel vision effect, and/or aligning the visual motion with the wearer's environmental SOB. Alternatively, or as well as the stimuli to override the wearer's sense of balance may be modified or inhibited, so that the wearer regains their balance.

If at step 512, if it is determined that the wearer is unlikely to be losing their balance, the method proceeds to step 516. At step 516 the wearer's configuration preferences can be optionally analysed. If the wearer is happy to have their sense of balance overridden whilst they are in motion, the method proceeds to step 524. At step 524, the wearer's SOB is modified by stimulating the wearer's vestibular systems using ultrasound. Depending upon the wearer's configuration preferences and/or the capability of the HMD processing system 100, the wearer's sense of balance may either be inhibited, or the wearer's SOB is modified to align with the visual motion (display aligned SOB). So, for example, a small visual motion to the left results in the generation of one or more control signals and transmitting the generated one or more control signals to a plurality of ultrasonic transducers to stimulate a wearer's vestibular systems. Thereby, through the wearer's SOB, the wearer feels a small motion to the left.

In the event that a larger visual motion to the left arises, one or more control signals are generated and transmitted to a plurality of ultrasonic transducers to stimulate a wearer's vestibular systems. However, for a larger visual motion, a larger acoustic radiation force is used, resulting in a larger force on an otolithic mass in the wearer's vestibular systems. Thereby, through the wearer's SOB, the wearer feels a larger motion to the left.

Figure 8:
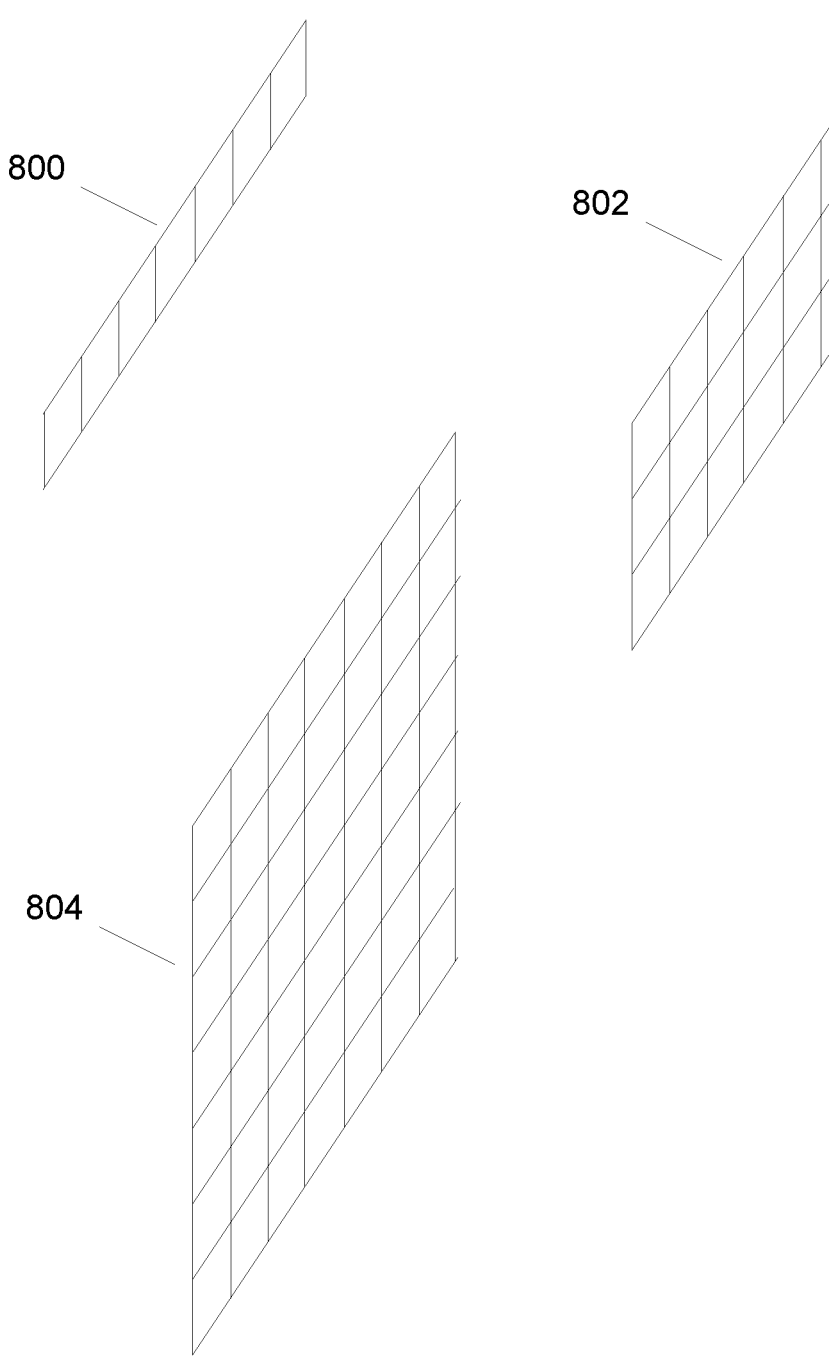
FIG. 8 depicts a beam forming array according to an embodiment of the technology described herein.

The calibration and re-calibration of the focus and intensity of the ultrasonic signals is shown in FIG. 6, which illustrates a flow chart for determining when to perform transducer re-calibration for an HMD processing system 100 according to an embodiment of the technology described herein together with the associated description. FIG. 7*a*, together with the associated description, depicts when there is a mismatch between the transmitted and generated control signal to the ultrasonic transducer and motion felt by a wearer. FIG. 8, together with the associated description, depicts a beam forming array according to an embodiment. More information on ultrasonic signal generation for vestibular stimulation according to an embodiment of the technology described herein can be found in FIG. 9, and the associated description.

If at step 516, the wearer's configuration preference is not to have their SOB overridden whilst they are in motion, the method proceeds to at step 522. At step 522, the wearer sense of balance is not modified.

Returning to step 510, the wearer's motion and wearer's pose determined in step 506, is analysed. If it is determined that the wearer is not motion, the method proceeds to step 514. At step 514 it is determined whether the wearer is standing, this can be determined by using sensor data from the IMU located in the HMD 206*a*, 206*b*. Alternatively, or in addition, sensor data from the front facing cameras 212*a*, 212*b*, together with visual odometry or SLAM processing, may be used to determine wearer pose, and therefore if the wearer is standing. If the wearer is standing, the method proceeds to step 512. At step 512 it is determined whether the wearer is losing their balance, if so, the method proceeds to step 520.

At step 520 the stimuli experienced by the wearer is modified. This can be performed by signalling the application generating the image sequence to minimize the disparity between the wearer's environmental SOB and visual motion, by modifying the visual motion of the sequence of image displayed on the HMD 202. This may be performed by fading the sequence of images displayed on the HMD 202, introducing a tunnel vision effect, and/or aligning the visual motion with the wearer's environmental SOB. Alternatively, or as well as the stimuli to override the wearer's SOB may be modified or inhibited.

In an embodiment, at step 512 the sensors, for example a heart rate sensor, a blood flow sensor, a skin resistance sensor (moisture level), an EMG sensor, an EEG sensor, an ECG sensor, a temperature sensor, an eye motion sensor, an eye pupil size sensor, a selfie camera sensor, may instead be interrogated and processed to determine how the wearer is reacting to the intensity of the extended reality experience. For example, for peaceful XR application experience, where the wearer has not exerted themselves, and the wearer is in a temperate environment, if the wearer's measured pulse rate exceeds a predetermined threshold, the wearer's measured skin resistance reduces (indicating that the wearer is sweating), and the wearer's pupils dilate as measured by the eye tracking sensors, the XR application may determine that the wearer's reaction is not expected. Information gathered from the sensors may be processed algorithmically to determine the wearer reaction value, if the determined wearer reaction value and XR application expected reaction value differ above a specified threshold, the XR application may then modify the sequence of the displayed images, and/or modify the wearer's sense of balance as in, step 520.

If at step 512 it is determined that the wearer is not losing their sense of balance, the method progresses to step 516 and the wearer's configuration preferences when they are standing are optionally determined. If the wearer allows modification of their SOB whilst standing the method proceeds to step 524. If at step 516 the wearer doesn't allow modification of their sense of balance whilst standing, the method proceeds and terminates at 522, where the wearer's SOB is not modified.

Returning to step 514; at step 514 it is determined if the wearer is standing. If the wearer is not standing, the method proceeds to step 524.

At step 524, the wearer's SOB is modified by stimulating the wearer's vestibular systems using ultrasound, to minimise wearer discomfort and/or motion sickness. Depending upon the wearer's configuration preferences and/or the capability of the HMD processing system 100, the wearer's sense of balance may either be inhibited, or the wearer's SOB is modified to align with the visual motion (display aligned SOB). So, for example, a small visual motion to the left results in the generation of one or more control signals and transmitting the generated one or more control signals to a plurality of ultrasonic transducers to control (stimulate) the wearer's vestibular systems. Thereby, either the wearer's SOB is inhibited, or the wearer "feels" a small motion to the left.

Ultrasound from the ultrasonic transducers is beam formed to steer, target, and focus the ultrasound on particular portions of the wearer's vestibular systems. If the headphones have not been configured, or if the headphones have moved on the wearer's head, the beam formed ultrasound may need to be recalibrated. FIG. 6 shows a flow chart of an example method to determine when to perform beamformed ultrasonic transducer recalibration for vestibular stimulation. At step 600 the identity of the wearer is optionally determined. Determining the wearer's identity may be performed by the wearer logging into the HMD processing system 100, issuing a voice command, eye-tracking sensors 216a and 216b or other biometric sensors (not shown).

If the wearer is identified the method proceeds to 602 where the wearer's HMD processing system 100 configuration preferences are fetched from memory 108. If the wearer is not identified, or step 600 is not performed, default user configuration preferences are used. The configuration preferences indicates whether the wearer (typically) moves, and magnitude of the movements, align with visual motion provided on HMD 202. For example, a specific wearer of the HMD 202, whilst playing a car racing game may often (unconsciously) tilt their head in the direction of the corner, whilst they are driving in the game. The magnitude of the wearer's movement, if any, may be dependent on the specific wearer, and the displayed content, for example considering a car racing game, a specific wearer may tilt their head more for displayed sharper or faster corners.

This likelihood of wearer motion, due to visual motion, can be determined during calibration, re-calibration of the HMD processing system 100, and/or determined when the wearer is using the HMD processing system 100 in normal operation. The likelihood of a wearer moving may be determined algorithmically, or by using machine learning techniques.

The configuration preferences may also indicate when the stimuli to override the wearer's environmental SOB should be provided to the wearer.

At step 604 it is determined whether the device containing the ultrasonic transducers (which may be the HMD 202) has just been worn, or if the device has moved on the wearer's head. If the ultrasonic transduces are integrated into the HMD 202, sensors, for example eye-tracking sensors 216a and 216b, or proximity sensors (not shown) may be used to determine if the HMD 202 has moved on the wearers head or has just been worn. Alternatively, if the ultrasonic transducers are integrated into a unit separate from the HMD 202, then this unit may have sensors, for example a proximity sensor that can be used to determine if the unit has recently been worn or if the unit has moved on the wearer's head (e.g. whether the HMD 202 has been recently been worn by the wearer based on a predetermined time threshold, or has changed position relative to a wearer's head based on a predetermined movement threshold). If at step 604 it is determined that the device that contains the ultrasonic transducers has recently been worn, or has moved on the wearer's head, the method progresses to step 614 and the recalibration procedure is performed (e.g. initiating a transducer recalibration process).

If at step 604 it is determined that the ultrasonic headphones haven't recently been worn and have not moved on the wearer's head, the method proceeds to step 606. In step 606, it is determined whether the wearer has requested recalibration. Recalibration can be requested by using an input on the HMD processing system 100. The input may include one or more scroll-wheels, touch sensitive regions, track pads, physical button, gesture, voice command. If it is determined that the wearer requested recalibration, the method proceeds to step 614, and recalibration procedure is performed.

If at step 606 it is determined that the wearer did not request recalibration, the method proceeds to step 608.

At step 608, if it is determined that the wearer does not move with the visual motion, the method proceeds to step 612. In step 612 recalibration is not performed.

Alternatively at step 608, if it is determined that the wearer does (normally) move with the visual motion the method proceeds to step 610. In step 610 the wearer motion and wearer pose are determined, by interrogating the IMUs housed in 206a, 206b and/or front facing cameras 212a, 212b and performing suitable processing. If the wearer movement is aligned with the visual motion the method proceeds to step 612. In step 612 recalibration is not performed.

Figure 7B:
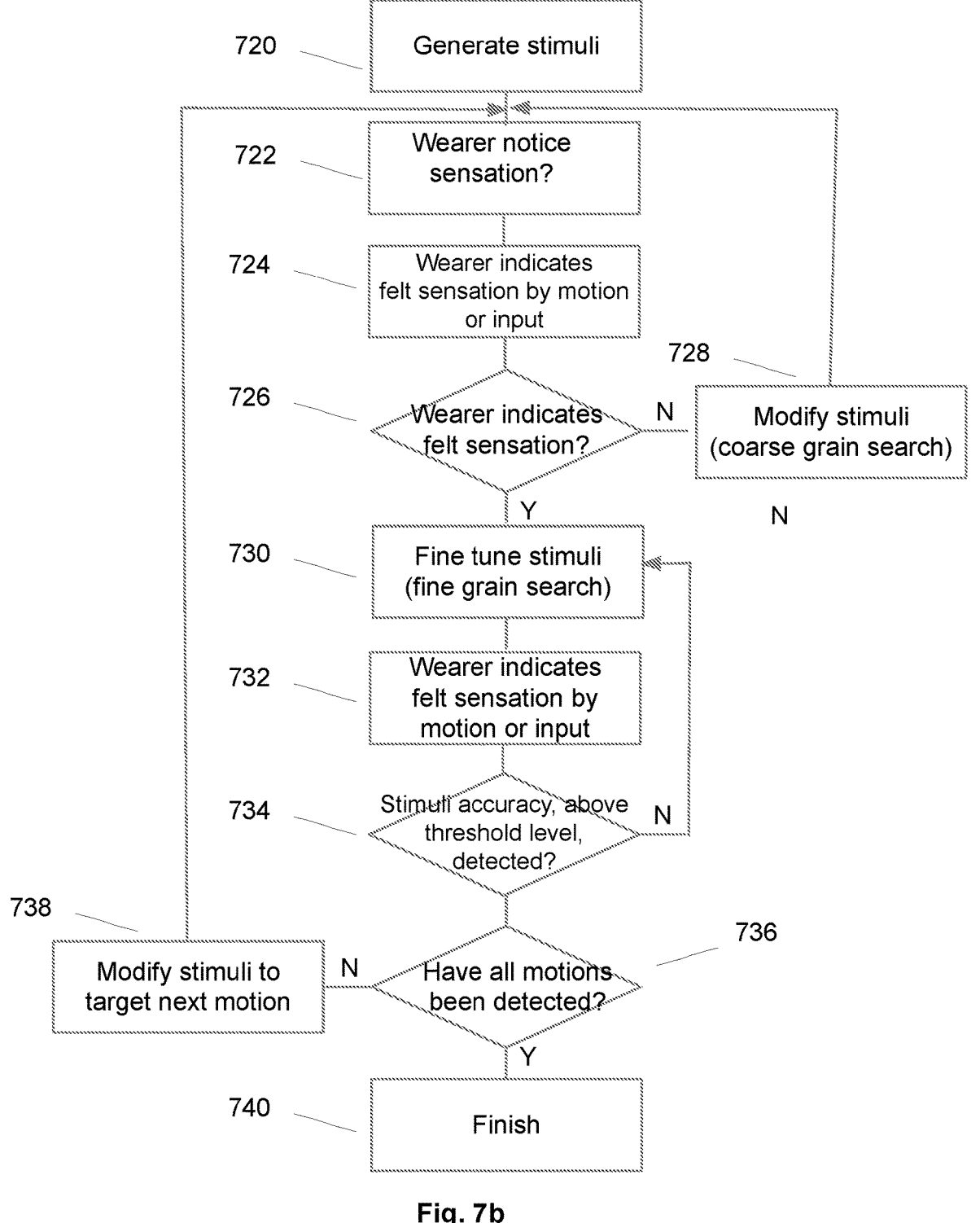
FIG. 7b illustrates a flow chart for determining when how to tune and focus the ultrasonic stimuli according to an embodiment of the technology described herein.

If the wearer movement is not aligned, or not moving with the expected magnitude, with the provided visual motion (e.g. wearer's user motion and visual motion of a sequence of images for display by the HMD do not align based on a predetermined threshold) the method proceeds to step 614, and recalibration is performed. More details on the recalibration process can be found in FIG. 7a and FIG. 7b, together with the associated description. FIG. 7a depicts when there is a mismatch between the transmitted and generated control signal to the ultrasonic transducer and motion felt by a wearer. FIG. 7b illustrates a flow chart for determining when how to tune and focus the ultrasonic stimuli according to an embodiment of the technology described herein.

Recalibration may be performed off-line, whilst the wearer is not actively engaged in a XR experience, or on-line. Off-line transducer recalibration may be performed when the HMD 202 and ultrasonic headphones are initially worn. On-line transducer recalibration may be performed continually or periodically during an XR experience, by for example monitoring a wearer's movement whilst engaged in an experience 610, making (minor) adjustments 614 and monitoring the result 610.

FIG. 7a shows the ultrasound reconfiguration process to focus the ultrasound to target the wearer's vestibular systems. When the wearer initially puts on the HMD 202 and/or separate headphones 226, or another device, that contain the ultrasonic transducers, or if the aforementioned unit moves on the wearer's head the unit may need to be reconfigured to target the wearer's vestibular systems, or an appropriate part of the wearer's vestibular systems, otherwise the wearer's sense of balance may not be stimulated, may be partly stimulated, or may be stimulated in an incorrect manner.

The recalibration process may be performed by the focused beam formed ultrasound being focussed swept in a (coarse grained) grid search or random search pattern. When the wearer notices a sensation effecting their sense of balance, they will indicate to the HMD processing system 100, by for example, pressing a button, blinking, issuing a spoken command, or moving their head, or moving in the appropriate direction.

The HMD processing system 100 will then perform a fine-grained search, to target specific portions of the wearer's vestibular system.

Different parts of the wearer's vestibular system are used to sense different movement and/or acceleration, specifically:

Horizontal Semi-circular Canals (HSCC) is used to sense head rotations about a vertical axis (e.g., side to side).

Superior Semi-circular Canals (SSCC) is used to sense head movement about a lateral axis (e.g., head to shoulder).

Posterior Semi-circular Canals (PSCC) is used to sense head rotation about a rostral-caudal axis (e.g., nodding).

Saccule otolith is used to sense linear acceleration and head tilt in the vertical plane (e.g., up and down)

Utricle otolith is used to sense linear acceleration and head-tilt on the horizontal plane (e.g., head to shoulder)

Both during calibration and in normal operation, the sensors in the HMD 202 are used to determine whether the wearer is in motion and therefore target the otolithic organs or the SCC depending upon the wearers motion.

The wearer indicates the motion that they feel by indicating the direction and magnitude of the motion on an appropriate input/controller and/or issuing a spoken command. In an embodiment the wearer moves their body or head in the felt direction. For example, if the wearer doesn't feel any motion, they will not move their head 700 or body. If the utricle otolith is stimulated the wearer will be requested to move their head to the appropriate shoulder with an appropriate magnitude to align with the stimulated sensation, 702, 704. If the saccule otolith is stimulated, the wearer will be requested to move their head up or down with an appropriate magnitude to align with the stimulated sensation, 706, 708. Sensors in the HMD 202 are interrogated to determine the wearer's head and/or body motion. More information on the calibration process can be found in FIG. 7b, that illustrates a flow chart determining how to tune and focus the ultrasonic stimuli according to an embodiment of the technology described herein.

Typically, left, and right inner-ear calibration will be performed separately.

Once all or a portion of the vestibular system sensory organs have been stimulated and input from the wearer analysed, in an embodiment the configuration is validated by requesting the wearer mimics the provided vestibular stimulation, by for example moving their head or a controller in an appropriate manner. The HMD processing system 100 can then analyse the wearer's input to confirm that the system is correctly calibrated.

FIG. 7b illustrates a flow chart for determining when and how to tune and focus the ultrasonic stimuli according to an embodiment of the technology described herein. The ultrasonic stimuli may be calibrated when the wearer first puts on the HMD 202, or re-calibrated manually, when the HMD 202 has moved relative to the wearer's head.

At step 720 ultrasonic stimuli are generated and provided to a wearer to override the wearer's environmental SOB. The stimuli may or may not target the wearer's vestibular systems.

At step 722 the wearer may notice a sensation modifying their SOB, the method proceeds to step 724.

At step 724 the wearer indicates the type of sensation, for example rotation motion to the left, that they felt by pressing an input, or performing a motion in an appropriate direction with an appropriate magnitude. The method proceeds to step 726.

At step 726 the HMD processing system 100 detects the input provided by the wearer. If no input from the wearer is detected, or the provided input indicates that the wearer did not feel a sensation, the method progresses to step 728.

At step 728 the beamformed focus point of the stimuli in the wearer's vestibular systems is modified. The focus point may be modified following a coarse grained, or random search pattern. The method then returns to step 722.

Returning to step 726 if the wearer does notice a sensation, the method proceeds to step 730.

At step 730 fine tuning of the stimuli is performed. The beamformed focus point of the stimuli in the wearer's vestibular systems is modified slightly, using a fine grained search pattern, and the method proceeds to step 732.

At step 732 the wearer indicates the type of sensation, for example rotation motion to the left, that they felt by pressing an input, or performing a motion in an appropriate direction with an appropriate magnitude. The method proceeds to step 734.

At step 734 the fine-tuned stimuli are analysed. If stimuli have been determined that the stimuli provide a sensation to a wearer below a threshold level, the method returns to step 730 where further fine tuning of stimuli is performed.

If at step 734 it is determined that the stimuli provide a sensation to a wearer above a threshold level, or an appropriate amount of fine tuning has been performed the method proceeds to step 736.

At step 736 it is determined if all the stimulated motions to be provided to the wearer have been detected, for example forward, backwards, left, right, up, and down motion, and forward, backwards, left, right, up and down rotation. If further stimulated motions are to be detected the method proceeds to step 738.

At step 738 the beamformed focus point of the stimuli in the wearer's vestibular systems is modified, for example using a coarse grained or random search pattern to aim to target the next stimulated motion. The method then proceeds to step 722.

If at step 736 all stimulated motions have been detected, the method proceeds to step 740.

At step 740 all stimulated motions have been determined and the HMD processing system 100 is calibrated to provide stimuli to the wearer's SOB. The calibration parameters are stored in the wearer's configuration preferences in memory 108.

FIG. 8 illustrates beam forming arrays according to an embodiment of the technology described herein. There will typically be one or more ultrasonic transducer per wearer's ear. Where there are multiple transducers per ear, beamforming may be used to target, specific parts of the wearer's inner ear vestibular systems. Thereby, either inhibiting or partially inhibiting the wearer's sense of balance and/or aligning the movement/pose felt by the wearer based on the sequence of images displayed on the HMD 202. FIG. 8 shows a number of transducer array types. 1-D transducer array, 800, is a linear array of equally spaced transducers. 1.5D transducer array, 802, comprises a 2D array of equally spaced transducers, however the lateral dimension significantly exceeds the vertical dimension. The 1.5D transducer array, 802, provides improved focussing compared to the 1D transducer array, 800. A 2D transducer array, 804, typically comprises a 2D array of equally spaced transducers, where the lateral and vertical dimensions are similar or the same. The 2D transducer array, 804, provides improved focus over the 1D, 800, and 1.5D transducer arrays, 802. It will be appreciated that other transducer types may be provided.

Low intensity focussed ultrasound (LiFU), for example 5 MHz ultrasound, can be used to selectively activate the vestibular system, by generating a force on the otolithic mass in the direction of the incident ultrasound wave. The LiFU may be applied either using bone conducted vibration (BCV) or air conducted sound (ACS). FIG. 9 shows two schemes in which LiFU can be supplied to stimulate the vestibular system, a high frequency pulsed scheme pLiFU, 910, and a low frequency continuous wave scheme cwLiFU, 920.

pLiFU, 910, uses short pulses of 5 MHz ultrasound with constant amplitude, with 5-100 pulses per second, 918, and a pulse width of 1-10 ms, 916. 912 shows the envelope waveform, and 914 shows the acoustic radiation force. This force is proportional to the acoustic intensity.

cwLiFU, 920, uses 5 MHz ultrasound that is amplitude modulated by a sinusoidal continuous wave with frequency from 0.1 to 100 Hz, 926. 922 shows the envelope waveform, and 924 shows the acoustic radiation force.

The above embodiments are to be understood as illustrative examples. Further embodiments are envisaged. For example, in the above-described embodiments, implementations using a combination of simultaneous location and mapping (SLAM) for wearer pose determination have been described. However, an alternative would be to use Semantic SLAM techniques in which objects are identified and located within the scene.

In an alternate embodiment, for wearers that suffer from motion sickness (due to a mismatch between the wearer's ego-motion and wearer's environmental SOB), for example when the wearer is in a car. The HMD processing system 100 can identify the wearer 500, and determine their configuration preferences 502, and determine whether they are prone to motion sickness. Using sensors in the HMD 202, the device may determine whether the wearer is standing or moving within the environment, and depending upon the configuration preferences the HMD processing system 100, may modify the motion felt by the wearer by stimulating the wearer's vestibular systems using ultrasonic transducers, or by modifying the sequence of images seen by the wearer, or by both modifying the wearer's environmental SOB and displayed visual stimuli to minimise the wearer's discomfort and/or motion sickness.

In an embodiment, the HMD processing system 100 may be configured to receive and store the wearer's configuration preferences, which includes information about the wearer, such as the wearer's preferred SOB stimuli override configuration preferences, wearer pose and motion stimuli override configuration preferences, and ultrasonic transducer configuration. In an embodiment, the wearer configuration preferences are stored in a cloud storage and are downloaded when the wearer starts using the HMD 202, for example after completing a log-in operation. In this way, if a wearer uses multiple, different HMDs 202 in different situations, the information in the wearer configuration preferences may be used by each of the multiple, different HMDs 202.

The HMD processing system 100 described herein may be implemented as part of any suitable system, such as a suitably configured microprocessor based system. In some embodiments, the technology described herein is implemented in a computer and/or microprocessor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuitries may share processing circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a HMD processing system 100.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The various circuitry, functional elements, stages, units, and "means" of the technology described herein may comprise a suitable processor or processors, controller or controllers, functional units, circuitry, circuits, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope, which is defined in the accompanying claims.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second," "third," and the like are used to distinguish different embodiments, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

In the preceding description, various embodiments of claimed subject matter have been described. For purposes of explanation, specifics, such as amounts, systems, and/or configurations, as examples, were set forth. In other instances, well-known features were omitted and/or simplified so as not to obscure claimed subject matter. While certain features have been illustrated and/or described herein, many modifications, substitutions, changes, and/or equivalents will occur to those skilled in the art. It is, therefore, to be understood that the appended claims are intended to cover all modifications and/or changes as fall within claimed subject matter.

According to an embodiment of the technology described herein there is a method of operating a head-mountable processing system, the method comprising: generating one or more control signals based upon a visual motion of a sequence of images for display by the head-mountable processing system; and transmitting the generated one or more control signals to a plurality of transducers to stimulate a wearer's vestibular systems.

According to an embodiment, the method of operating a head-mountable processing system further comprises: comparing the visual motion of a sequence of images for display by the head-mountable processing system to a threshold (to determine whether the wearer will experience motion sickness); and based on the comparison between visual motion of a sequence of images for display by the head-mountable processing system and the threshold, generating the one or more control signals based upon the visual motion of a sequence of images for display by the head-mountable processing system; and transmitting the generated one or more control signals to a plurality of transducers to stimulate the wearer's vestibular system to control the wearer's sense of balance.

According to an embodiment, the method of operating a head-mountable processing system comprises: processing sensor data from a sensor in the head-mountable processing system to determine a wearer's user motion.

According to an embodiment, the method of operating a head-mountable processing system further comprises: comparing the visual motion of a sequence of images for display by the head-mountable processing system to the wearer's user motion; and based on the comparison between the visual motion of a sequence of images for display by the head-mountable processing system and the wearer's user motion, generating the one or more control signals based upon the visual motion of a sequence of images for display by the head-mountable processing system.

According to an embodiment, the method of operating a head-mountable processing system comprises transmitting the generated one or more control signals to a plurality of transducers to stimulate the wearer's vestibular systems aligns the wearer's sense of balance with the visual motion.

According to an embodiment, the method of operating a head-mountable processing system comprises an application executing on the head-mountable processing system that is configured to generate the sequence of images for display by the head-mountable processing system; and wherein the sequence of images displayed on the head-mountable processing system is analysed to determine the visual motion; and/or wherein the application is interrogated to determine the visual motion.

According to an embodiment, the sequence of images for display by the head-mountable processing system are generated using at least one of generated image data or captured sensor image data from the sensor in the head-mountable display.

According to an embodiment, the method of operating a head-mountable processing system comprises transmitting the generated one or more control signals to a plurality of transducers to stimulate a wearer's vestibular systems is dependent upon the wearer's pose and/or the wearer's motion.

According to an embodiment, the method of operating a head-mountable processing system further comprises determining an identity of the wearer by the head-mountable processing system by processing data from an input device and/or sensors of the head-mountable processing system; and wherein generating the one or more control signals is further based on the wearer's configured preference.

According to an embodiment, the plurality of transducers are beamformed to focus on the wearer's vestibular systems.

According to an embodiment, the plurality of transducers are configured to generate ultrasound which is transmitted to the wearer using bone conducted vibration or air conducted sound.

According to an embodiment, the method of operating a head-mountable processing system further comprises analysing a wearer's user motion to determine a wearer loss of balance probability; and in response to determining that the wearer loss of balance probability is indicative of the wearer losing their balance, generating the one or more control signals further based upon visual motion of a sequence of images for display by the head-mountable processing system so that the wearer regains their balance.

According to an embodiment, the method of operating a head-mountable processing system further comprises analysing the wearer's user motion to determine a wearer loss of balance probability; and when the wearer loss of balance probability is determined to be indicative of the wearer losing their balance, modifying the sequence of images for display by the head-mountable processing system to reduce visual motion so that the wearer regains their balance.

According to an embodiment, the method of operating a head-mountable processing system further comprises analysing sensor data from a sensor in the head-mountable processing system to determine whether the head-mountable display has: been recently worn by the wearer based on a time threshold; and/or changed position relative to a wearer's head based on a movement threshold; and based on a determination that either the time threshold or the movement threshold is exceeded, initiating a transducer recalibration process.

According to an embodiment, the method of operating a head-mountable processing system further comprises determining when a wearer's user motion and visual motion of a sequences images for display by the head-mountable processing system do not align based on a threshold; and initiating a transducer recalibration process.

According to an embodiment, the method of operating a head-mountable processing system further comprises processing sensor data from a sensor in the head-mountable processing system by an application executing on the head-mountable processing system to determine a reaction value for a wearer based on the display of the sequence of images for display by the head-mountable processing system; and wherein when the determined reaction value differs from a XR application expected reaction value by a threshold the sequence of images for display by the head-mountable processing system the amount of visual motion is modified.

According to an embodiment there is a Non-transitory computer-readable storage medium storing a computer program comprising instructions that, when executed by a processor, causes the head-mountable processing system to perform a method to operate a head-mountable processing system, the method comprising: generating one or more control signals based upon a visual motion of a sequence of images for display by the head-mountable processing system; and transmitting the generated one or more control signals to a plurality of transducers to stimulate a wearer's vestibular systems.

According to an embodiment there is a head-mountable processing system comprising: a head-mountable device; a plurality of transducers for stimulation of the vestibular system of a wearer; a processing circuit to determine a visual motion of a sequence of images for display by the head-mountable processing system; a control circuit to generate one or more control signals based on the visual motion; a communication circuit to transmit one or more control signals to the plurality of transducers to control stimulation of a wearer's vestibular system.

According to an embodiment of the head-mountable processing system the plurality of transducers are integrated into a headphone.

The invention claimed is:

1. A method to operate a head-mountable processing system, the method comprising:

comparing a visual motion of a sequence of images for display by the head-mountable processing system to a threshold; and based on the comparison between the visual motion of the sequence of images for display by the head-mountable processing system and the threshold, generating one or more control signals based upon the visual motion of the sequence of images for display by the head-mountable processing system; and transmitting the generated one or more control signals to a plurality of transducers to stimulate a wearer's vestibular systems to control the wearer's sense of balance.

2. The method according to claim 1, further comprising:

processing sensor data from a sensor in the head-mountable processing system to determine a wearer's user motion.

3. The method according to claim 2, further comprising:

comparing the visual motion of a sequence of images for display by the head-mountable processing system to the wearer's user motion; and based on the comparison between the visual motion of a sequence of images for display by the head-mountable processing system and the wearer's user motion, generating the one or more control signals based upon the visual motion of a sequence of images for display by the head-mountable processing system.

4. The method according to claim 3 wherein comparing the visual motion of a sequence of images for display by the head-mountable processing system to the wearer's user motion comprises determining when a difference between the visual motion of a sequence of images for display by the head-mountable processing system and the wearer's user motion exceeds a threshold; and wherein the one or more control signals are generated in response to the difference exceeding the threshold.

5. The method according to claim 2 wherein:
transmitting the generated one or more control signals to a plurality of transducers to stimulate the wearer's vestibular systems aligns the wearer's sense of balance with the visual motion.

6. The method according to claim 1, wherein an application executing on the head-mountable processing system is configured to generate the sequence of images for display by the head-mountable processing system; and
wherein the sequence of images displayed on the head-mountable processing system is analysed to determine the visual motion; and/or
wherein the application is interrogated to determine the visual motion.

7. The method according to claim 1, wherein the sequence of images for display by the head-mountable processing system are generated using at least one of generated image data or captured sensor image data from a sensor in the head-mountable display.

8. The method according to claim 1, wherein transmitting the generated one or more control signals to a plurality of transducers to stimulate a wearer's vestibular systems is dependent upon the wearer's pose and/or the wearer's motion.

9. The method according to claim 1, further comprising determining an identity of the wearer by the head-mountable processing system by processing data from an input device and/or sensors of the head-mountable processing system; and
wherein generating the one or more control signals is further based on the wearer's configured preference.

10. The method according to claim 1, wherein the plurality of transducers are beamformed to focus on the wearer's vestibular systems.

11. The method according to claim 1, wherein the plurality of transducers are configured to generate ultrasound which is transmitted to the wearer using bone conducted vibration or air conducted sound.

12. The method according to claim 2, further comprising analysing the wearer's user motion to determine a wearer loss of balance probability; and
in response to determining that the wearer loss of balance probability is indicative of the wearer losing their balance, generating the one or more control signals further based upon visual motion of a sequence of images for display by the head-mountable processing system so that the wearer regains their balance.

13. The method according to claim 2, further comprising analysing the wearer's user motion to determine the wearer loss of balance probability; and
when the wearer loss of balance probability is determined to be indicative of the wearer losing their balance, modifying the sequence of images for display by the head-mountable processing system to reduce visual motion so that the wearer regains their balance.

14. The method according to claim 1, further comprising analysing sensor data from a sensor in the head-mountable processing system to determine whether the head-mountable display has:
been recently worn by the wearer based on a time threshold; and/or
changed position relative to the wearer's head based on a movement threshold; and
based on a determination that either the time threshold or the movement threshold is exceeded, initiating a transducer recalibration process.

15. The method according to claim 2, further comprising determining when the wearer's user motion and visual motion of a sequences images for display by the head-mountable processing system do not align; and
in response to determining that a wearer's user motion and visual motion of a sequences images for display by the head-mountable processing system do not align initiating a transducer recalibration process.

16. The method according to claim 1, further comprising processing sensor data from a sensor in the head-mountable processing system by an application executing on the head-mountable processing system to determine a reaction value for the wearer based on the display of the sequence of images for display by the head-mountable processing system; and
wherein when the determined reaction value differs from a XR application expected reaction value by a threshold the sequence of images for display by the head-mountable processing system the amount of visual motion is modified.

17. Non-transitory computer-readable storage medium storing a computer program comprising instructions that, when executed by a processor, causes the head-mountable processing system to perform a method to operate a head-mountable processing system, the method comprising:
comparing a visual motion of a sequence of images for display by the head-mountable processing system to a threshold; and
based on the comparison between the visual motion of the sequence of images for display by the head-mountable processing system and the threshold,
generating one or more control signals based upon the visual motion of the sequence of images for display by the head-mountable processing system; and
transmitting the generated one or more control signals to a plurality of transducers to stimulate a wearer's vestibular systems to control the wearer's sense of balance.

18. A head-mountable processing system comprising:
a head-mountable device;
a plurality of transducers for stimulation of the vestibular system of a wearer;
a processing circuit to compare a visual motion of a sequence of images for display by the head-mountable processing system to a threshold;
a control circuit to generate, based on the comparison between the visual motion of the sequence of images for display by the head-mountable processing system and the threshold, one or more control signals based upon the visual motion of the sequence of images for display by the head-mountable processing system;

a communication circuit to transmit one or more control
    signals to the plurality of transducers to control stimu-
    lation of a wearer's vestibular system to control the
    wearer's sense of balance.

19. The head-mountable processing system as claimed in
claim 18, wherein the plurality of transducers is integrated
into a headphone.

* * * * *